US009628762B2

(12) United States Patent
Farritor

(10) Patent No.: US 9,628,762 B2
(45) Date of Patent: *Apr. 18, 2017

(54) SYSTEM FOR IMAGING AND MEASURING RAIL DEFLECTION

(71) Applicant: Board of Regents of the University of Nebraska, Lincoln, NE (US)

(72) Inventor: Shane Farritor, Lincoln, NE (US)

(73) Assignee: Board of Regents of the University of Nebraska, Lincoln, NE (US)

( * ) Notice: Subject to any disclaimer, the term of this patent is extended or adjusted under 35 U.S.C. 154(b) by 680 days.

This patent is subject to a terminal disclaimer.

(21) Appl. No.: 13/832,413

(22) Filed: Mar. 15, 2013

(65) Prior Publication Data
US 2014/0152814 A1 Jun. 5, 2014

Related U.S. Application Data

(60) Provisional application No. 61/733,287, filed on Dec. 4, 2012.

(51) Int. Cl.
*H04N 7/18* (2006.01)
*B61K 9/08* (2006.01)
(Continued)

(52) U.S. Cl.
CPC ............... *H04N 7/18* (2013.01); *B61K 9/08* (2013.01); *G01B 11/2518* (2013.01); *G06K 9/209* (2013.01); *G06K 9/2036* (2013.01)

(58) Field of Classification Search
CPC .... B61K 9/08; G01B 11/2518; G06K 9/2036; G06K 9/209
See application file for complete search history.

(56) References Cited

U.S. PATENT DOCUMENTS 3,960,005 A 6/1976 Vezina
4,010,636 A 3/1977 Clark et al.
(Continued)

FOREIGN PATENT DOCUMENTS

EP 0378781 7/1990
EP 2182351 5/2010
(Continued)

OTHER PUBLICATIONS

G. Hayes, et al., "Track Stiffness Measurement System Evaluation Program" prepared for the U.S. Department of Transportation, Federal Railroad Administration, Office of Reseach and Development, Washington, DC, Final Report No. FRA/ORD—79/30 (PB80-165293), Dec. 1979, pp. 1-174.
(Continued)

*Primary Examiner* — Dave Czekaj
*Assistant Examiner* — Md Haque
(74) *Attorney, Agent, or Firm* — Davis, Brown, Koehn, Shors & Roberts, P.C.; Sean D. Solberg

(57) ABSTRACT

Devices, systems, and methods for imaging and measuring deflections in structures such as railroad rail are disclosed. One exemplary embodiment relates to a vision system having a high-speed, visible-light imaging camera and an evaluation unit configured for analyzing images from the camera to detect geometric variations in the structure. In a second example, additional sensors are used to identify the wheel location(s) in the same reference frame as the measurement system. In analyzing structures such as railroad track rail, the imaging camera can be coupled to a moving rail vehicle and configured for generating images of the rail as the vehicle moves along the track.

20 Claims, 12 Drawing Sheets

(51) Int. Cl.
*G01B 11/25* (2006.01)
*G06K 9/20* (2006.01)

(56) References Cited

U.S. PATENT DOCUMENTS

| | | | |
|---|---|---|---|
| 4,283,953 A | 8/1981 | Plora | |
| 4,435,984 A | 3/1984 | Gruber | |
| 5,020,371 A | 6/1991 | Panetti | |
| 5,135,165 A | 8/1992 | Greenhow | |
| 5,335,184 A | 8/1994 | Hildebrand | |
| 5,341,683 A | 8/1994 | Searle | |
| 5,386,727 A | 2/1995 | Searle | |
| 5,390,544 A | 2/1995 | Madras | |
| 5,721,685 A | 2/1998 | Holland et al. | |
| 5,753,808 A | 5/1998 | Johnson | |
| 6,044,698 A | 4/2000 | Bryan | |
| 6,105,431 A | 8/2000 | Duffill et al. | |
| 6,119,353 A | 9/2000 | Gronskov | |
| 6,430,875 B1 | 8/2002 | Clark et al. | |
| 6,647,891 B2 | 11/2003 | Holmes et al. | |
| 6,742,392 B2 | 6/2004 | Gilmore et al. | |
| 6,908,066 B2 * | 6/2005 | Koenig | 246/122 A |
| 6,927,409 B2 | 8/2005 | Ciani | |
| 7,403,296 B2 | 7/2008 | Farritor et al. | |
| 7,616,329 B2 | 11/2009 | Villar et al. | |
| 7,755,774 B2 | 7/2010 | Farritor et al. | |
| 7,920,984 B2 | 4/2011 | Farritor | |
| 7,937,246 B2 | 5/2011 | Farritor et al. | |
| 7,942,058 B2 | 5/2011 | Turner | |
| 8,887,572 B2 | 11/2014 | Turner | |
| 2004/0003662 A1 | 1/2004 | Kenderian et al. | |
| 2005/0072236 A1 | 4/2005 | Heyman et al. | |
| 2006/0136152 A1 | 6/2006 | Takahaski | |
| 2007/0214892 A1 | 9/2007 | Turner et al. | |
| 2008/0228436 A1 | 9/2008 | Farritor | |
| 2009/0056454 A1 | 3/2009 | Turner | |
| 2009/0070064 A1 * | 3/2009 | Farritor et al. | 702/150 |
| 2009/0282923 A1 | 11/2009 | Havira | |
| 2010/0004804 A1 * | 1/2010 | Anderson et al. | 701/19 |
| 2010/0026551 A1 | 2/2010 | Szwilski et al. | |
| 2010/0026557 A1 | 2/2010 | Wilcox | |
| 2010/0111133 A1 | 5/2010 | Yuhas et al. | |
| 2010/0288049 A1 | 11/2010 | Hoyt | |
| 2011/0098942 A1 | 4/2011 | Turner | |
| 2011/0166827 A1 | 7/2011 | Farritor et al. | |
| 2012/0132005 A1 | 5/2012 | Turner et al. | |
| 2012/0274772 A1 | 11/2012 | Fosburgh et al. | |
| 2012/0300060 A1 | 11/2012 | Farritor | |

FOREIGN PATENT DOCUMENTS

| | | |
|---|---|---|
| JP | 07174643 | 7/1995 |
| JP | 2006258531 | 3/2009 |
| RU | 1801844 | 3/1993 |
| WO | WO 2006004846 | 1/2006 |
| WO | WO2012074997 | 6/2012 |

OTHER PUBLICATIONS

Ghoshal, Goutam et al., "Diffuse Ultrasonic Backscatter in a Two-Dimensional Domain", ACTA Mechanica, vol. 205, No. 1-4, pp. 35-49, Apr. 21, 2009.

International Search Report and Written Opinion issued in PCT/US2011/062383, mailed Mar. 5, 2012, 11 pages.

Lu, Sheng et al., "Exception Criteria in Vertical Track Deflection and Modulus", 2007 ASME/IEEE Joint Rail Conference & Internal Combustion Engine Spring Technical Conference, Mar. 13, 2007, Pueblo, CO USA, 12 pages.

Lu, S. et al. "Measurement of Vertical Track Modulus from a Moving Railcar," Proceedings of the AREMA 2006 Annual Conference, Louisville, KY, Sep. 17, 2006.

Lu, S. et al., "On the Relationship Between Load and Deflection in Railroad Track Structure," Proceedings of the AREMA 2008 Annual Conference, Salt Lake City, UT, Sep. 21, 2008.

* cited by examiner

SYSTEM FOR IMAGING AND MEASURING RAIL DEFLECTION

CROSS-REFERENCE TO RELATED APPLICATION

This application claims priority from U.S. Provisional Application 61/733,287, filed Dec. 4, 2012, and entitled "System for Imaging and Measuring Rail Deflection," which is hereby incorporated herein by reference in its entirety.

FEDERALLY SPONSORED RESEARCH OR DEVELOPMENT

This invention was made with government support under FRA grant FR-RRD-0026-11-01-00, entitled "Measurement of Vertical Track Deflection: Testing, Demonstration & Implementation." The government has certain rights in the invention.

TECHNICAL FIELD

The present disclosure relates generally to analyzing deflections in structures. More specifically, the present disclosure pertains to devices, systems, and methods for imaging and measuring deflections in structures such as railroad rails.

BACKGROUND

The economic constraints of both passenger and freight railroad traffic are moving the railroad industry to higher-speed vehicles and higher axle loads. The heavy axle loads and high speeds of modern freight trains produce high track stresses leading to quicker deterioration of track conditions. As a result, the demand for better track maintenance has also increased. Fast and reliable methods are thus needed to identify and prioritize tracks in need of maintenance in order to minimize delays, avoid derailments, and reduce maintenance costs.

The condition and performance of railroad tracks depends on a number of different parameters. Some of the factors that can influence track quality are track modulus, internal rail defects, profile, cross-level, gage, and gage restraint. Monitoring one or more of these parameters can improve safe train operation by identifying track locations that produce poor vehicle performance or derailment potential. Track monitoring also provides information for optimizing track maintenance activities by focusing activities where maintenance is critical and by selecting more effective maintenance and repair methods.

Track modulus is an important factor that affects track performance and maintenance requirements. Track modulus is defined generally as the coefficient of proportionality between the rail deflection and the vertical contact pressure between the rail base and track foundation. In some cases, track modulus can be expressed as the supporting force per unit length of rail per unit rail deflection. Track modulus is a single parameter that represents the effects of all of the track components under the rail. These components include the subgrade, ballast, subballast, ties, and tie fasteners. Both the vertical deflection characteristics of the rail as well as the track components supporting the rail can affect track modulus. For example, factors such as the subgrade resilient modulus, subgrade thickness, ballast layer thickness, and fastener stiffness can affect track modulus.

Variations in track shape and structural integrity present hurdles in the rail industry: both low track modulus and large variations in track modulus are undesirable. Low track modulus can cause differential settlement that subsequently increases maintenance needs. Large variations in track modulus, such as those often found near bridges and crossings, can also increase dynamic loading. Increased dynamic loading reduces the life of the track components, resulting in shorter maintenance cycles. A reduction in variations in track modulus at grade (i.e. road) crossings can lead to better track performance and less track maintenance. It has also been suggested that track with a high and consistent modulus will allow for higher train speeds and therefore increase both performance and revenue. Ride quality, as indicated by vertical acceleration, is also strongly dependent on track modulus.

In addition to track modulus, variations in rail geometry resulting from track defects can also affect track performance. The relationship between modulus and geometry is complex. In some cases, areas of geometry variations often correlate with areas of modulus variations and vice versa.

Finally, track deflection is also important. Track deflection is related to the applied loads, and the track modulus (and stiffness) is also an important factor. Deflection is defined as the ratio of applied load to track stiffness. More general, it can be defined as the vertical displacement of a single point of rail from the unloaded to the fully loaded condition.

SUMMARY

The present disclosure relates generally to imaging and measuring deflections in structures such as a railroad rail. An exemplary vision system for imaging geometric variations along a railroad track comprises at least one imaging camera adapted for coupling to a moving rail vehicle located on the rail. The imaging camera configured for generating images of the shape of the rail (or an approximation of the shape) during vehicle movement along the rail; and an evaluation unit including an image processor configured for analyzing the images from the imaging camera.

In the exemplary methods described, the various embodiments encompass measurement systems for determining geometric relationships to identify the shape of the rail beneath the railcar's wheels. These shapes can then be used to draw conclusions about the deflection, modulus, rail curvature, stiffness and/or other parameters relevant to track quality, so as to better provide for the analysis of the structural integrity.

A first exemplary method for analyzing the geometric shape of a railroad track rail comprises acquiring a plurality of images from at least one imaging camera coupled to a moving rail vehicle; detecting a location of the rail within each acquired image; identifying and measuring a change in the position or shape of the rail away from an expected position or shape of the rail within each image; and determining vertical track deflection data at a plurality of different locations along the rail. This may include the use of structured light such as a line laser.

A second example is also presented for a different type of railcar with a different suspension system or device. In this type of rail car the wheels (i.e. axles) have a suspension system or device (i.e. springs and/or dampers) between the railcar sideframe and the wheels. This is sometimes seen in passenger railcars or locomotives. In this example, separate measurement sensors are used to identify the location of the wheels (and or axles) with respect to the sideframe or each other. Then, the rail position can also be measured relative to the sideframe to give an understanding of the rail shape.

While multiple embodiments are disclosed, still other embodiments will become apparent to those skilled in the art from the following detailed description, which shows and describes illustrative embodiments of the invention. Accordingly, the drawings and detailed description are to be regarded as illustrative in nature and not restrictive.

Figure 1:
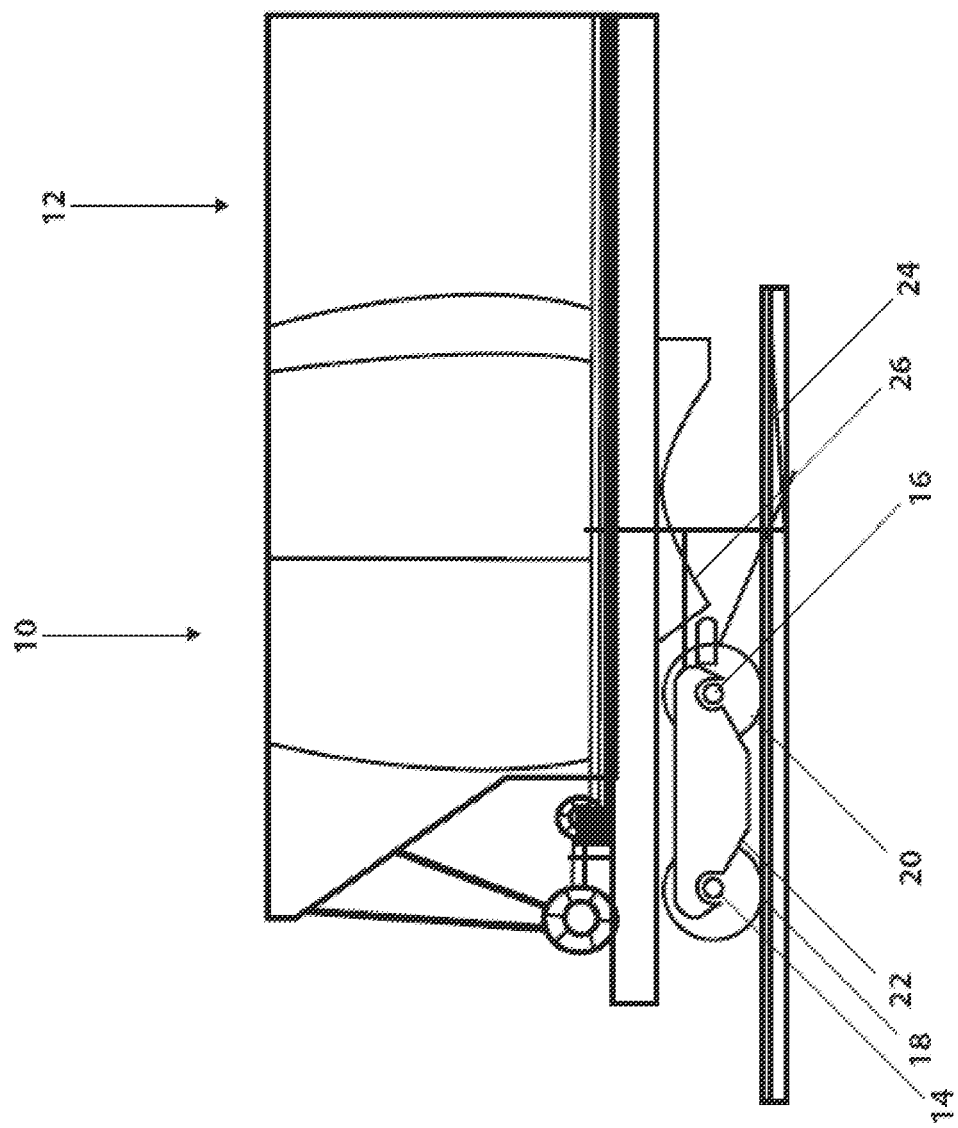
FIG. 1 is a side view of a certain embodiment of a system for imaging and measuring deflections in a structure.

While the various embodiments disclosed and contemplated herein are amenable to various modifications and alternative forms, specific embodiments have been shown by way of example in the drawings and are described in detail below. The intention, however, is not to limit the disclosure to the particular embodiments described. On the contrary, the various embodiments are intended to cover all modifications, equivalents, and alternatives falling within the scope of the those embodiments as defined by the appended claims.

DETAILED DESCRIPTION

The present disclosure describes devices, systems, and methods for imaging and measuring deflections in structures such as a railroad rail. In some embodiments, for example, the devices, systems, and methods can be used to detect geometric changes in the rail that can affect the calculation of vertical track modulus and/or other characteristics of the rail. Although various embodiments are described in the context of imaging and measuring rail deflections in a railroad rail, the devices, systems, and methods described herein can be used to image and measure deflections in other types of structures that are subjected to static and/or dynamic loading.

Two sets of exemplary embodiments are described herein. A first set relates to a system to be mounted on what is commonly called a three piece truck. Illustrative examples of these embodiments are shown in FIGS. 1-5. A second set of exemplary embodiments relates to a system to be used on a truck structure having a suspension system or device—and therefore significant relative movement—between the sideframe and axles. Illustrative examples of these embodiments are shown in FIGS. 6-12.

The first exemplary embodiment is shown in FIG. 1. FIG. 1 is a schematic view showing certain components of an imaging and deflection measurement system 10, also known as the "measurement system vertical." As shown in FIG. 1, in certain embodiments the measurement system vertical 10 can be incorporated into a railcar 12. In this figure, the system 10 embodiment is overlaid onto a photograph of a railcar to give the proper proportion, as shown by reference lines A and B. The measurement system apparatus 26 is depicted schematically on the railcar 12. In addition, the two axles 14, 16 and wheels 18, 20 of the railcar are shown with the sideframe 22 affixed to the two axles 14, 16. The deflected rail 24 to be measured under the weight of the train is also shown.

Figure 2:
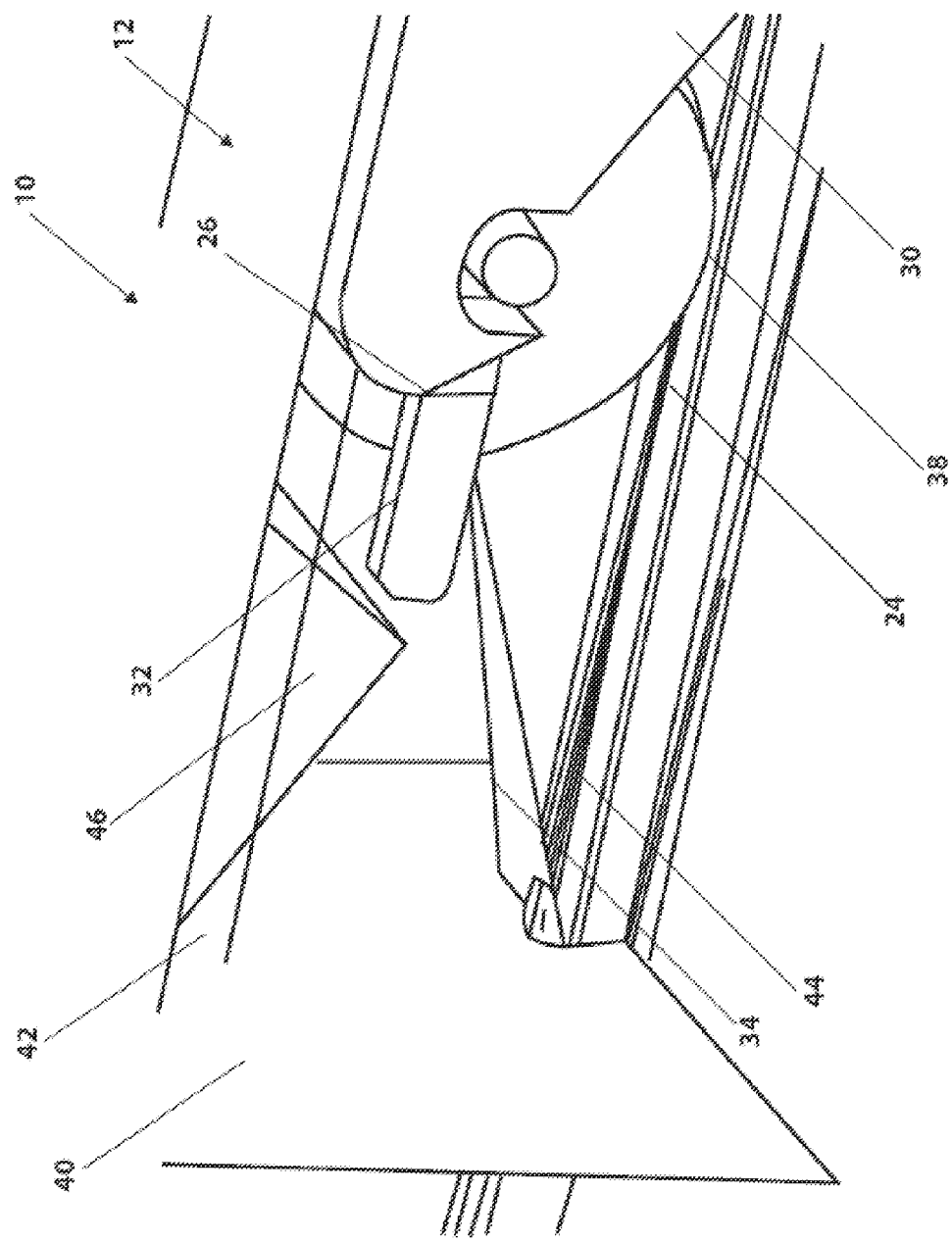
FIG. 2 is a perspective view of an illustrative vision system for imaging and measuring deflections in a structure.

FIG. 2 shows another exemplary embodiment of an imaging and deflection measurement system 10. FIG. 2 depicts the measurement apparatus 26 mounted to the railcar sideframe 30. In this embodiment, a camera 32 and laser line 34 are used to measure the height of the deflected rail 24 at a distance (shown by reference number 36) from the railcar wheel 38. Overlain schematically on the present deflected rail 24 is a line showing the expected position of an undeflected rail 44. A measurement plane 40 is schematically depicted here by way of example to show the approximate location 42 of the measurement of the height of the railcar 12. The measurement plane shown in FIG. 2 is not actual physical structure, but instead is included as an example to describe where and how a measurement is made, as would be readily apparent to one of skill in the art. Alternatively, other systems could be used to measure the distance between the measurement system (i.e. sensor head) and the rail such as interferometry, acoustic based measurements, and the like, as are well known in the art.

In this exemplary embodiment, the measurement equipment mounting (shown here by reference number 26) places the camera 32 above an operating dump door 46 of the rail car, which could be, for example, a hopper car. The mounting location allows the hopper car to continue to operate (be loaded and unloaded) while the measurement apparatus 26 is attached and protects the apparatus 26 from the material as it exits from the dump door 46. As would be clear to one of skill in the art, other mounting locations are possible for other cars when separate concerns are present.

Figure 3:
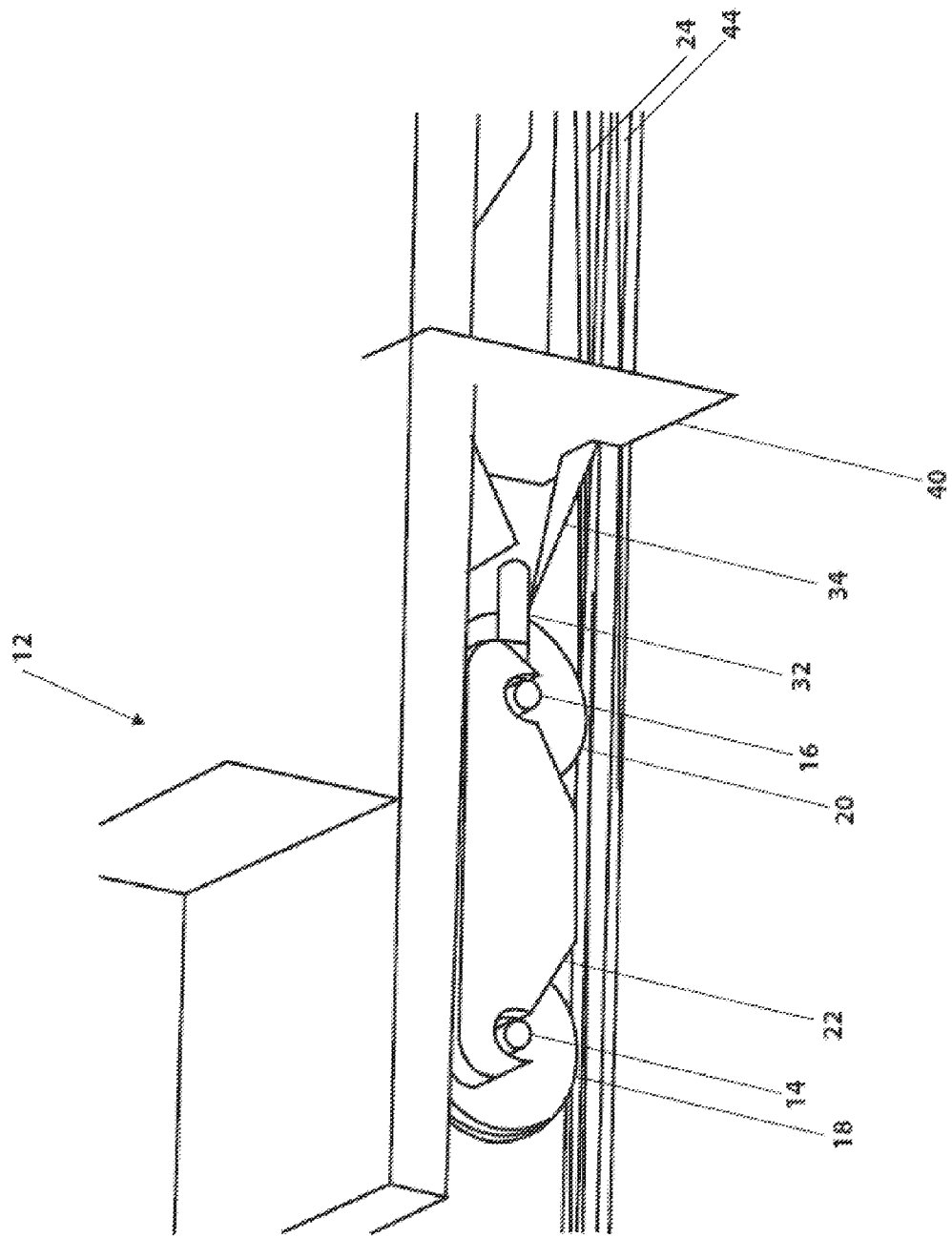
FIG. 3 is another perspective view showing an illustrative implementation of a system for imaging and measuring vertical deflections along a railroad rail.
Figure 4:
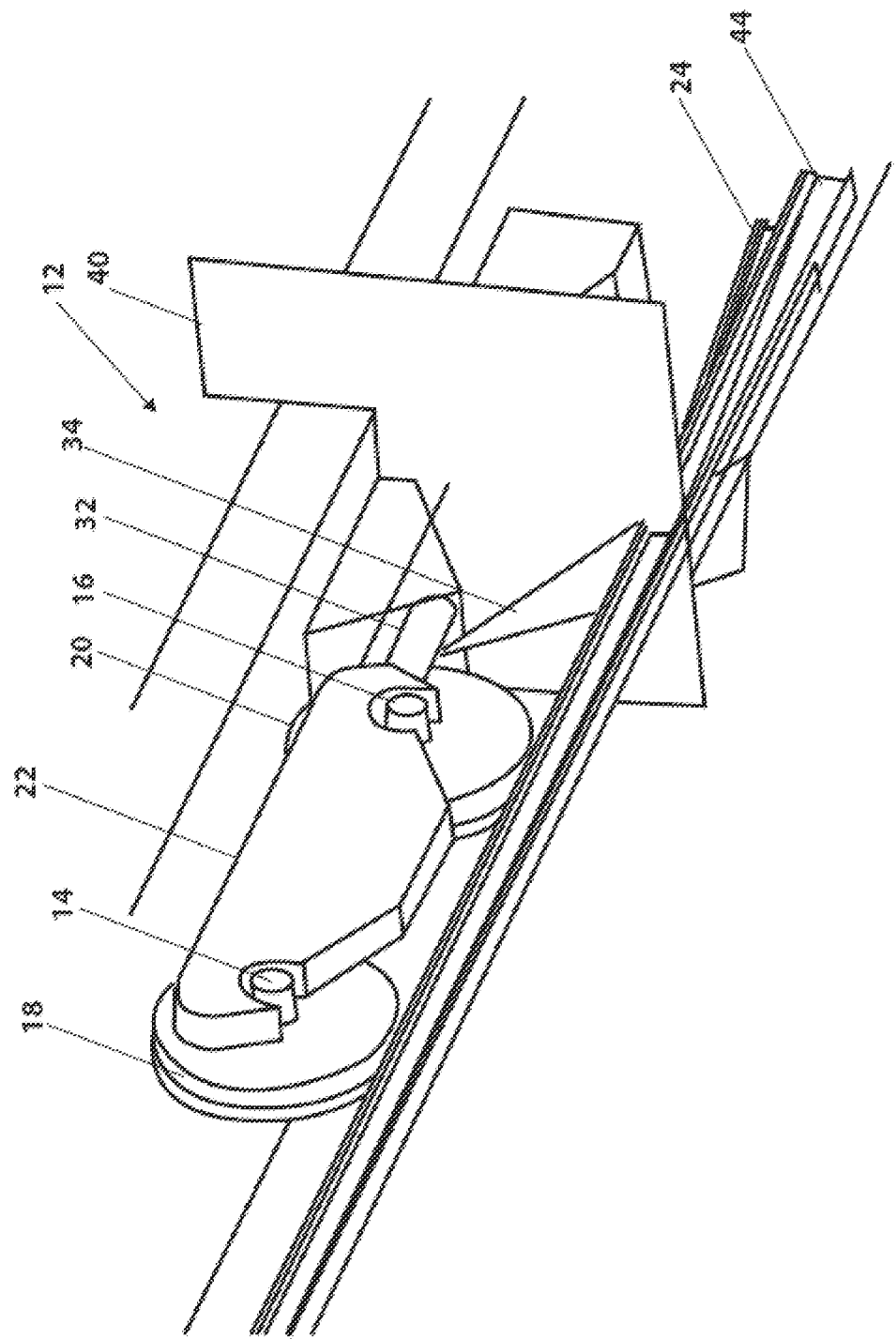
FIG. 4 is another perspective view showing another illustrative implementation of a system for imaging and measuring vertical deflections along a railroad rail.

FIGS. 3-4 show alternate above (FIG. 3) and below (FIG. 4) views of certain exemplary embodiments of the measurement system 10 on the railcar 12. FIGS. 3-4 depict the sideframe 22, the wheels 18, 20, axels 14, 16, camera 32, line laser 34, and measurement plane 40. By way of example, in FIGS. 3-4, two rails are also depicted: one is deflected 24 and the second is the expected position of an un-deflected rail 44. In this embodiment, the un-deflected rail 44 is substantially perfectly straight, though other embodiments can be less substantially so. FIGS. 3-4 depict how in certain embodiments the measurement system is capable of measuring a rail intersecting the measurement plane at different locations while the train crosses the track.

Figure 5:
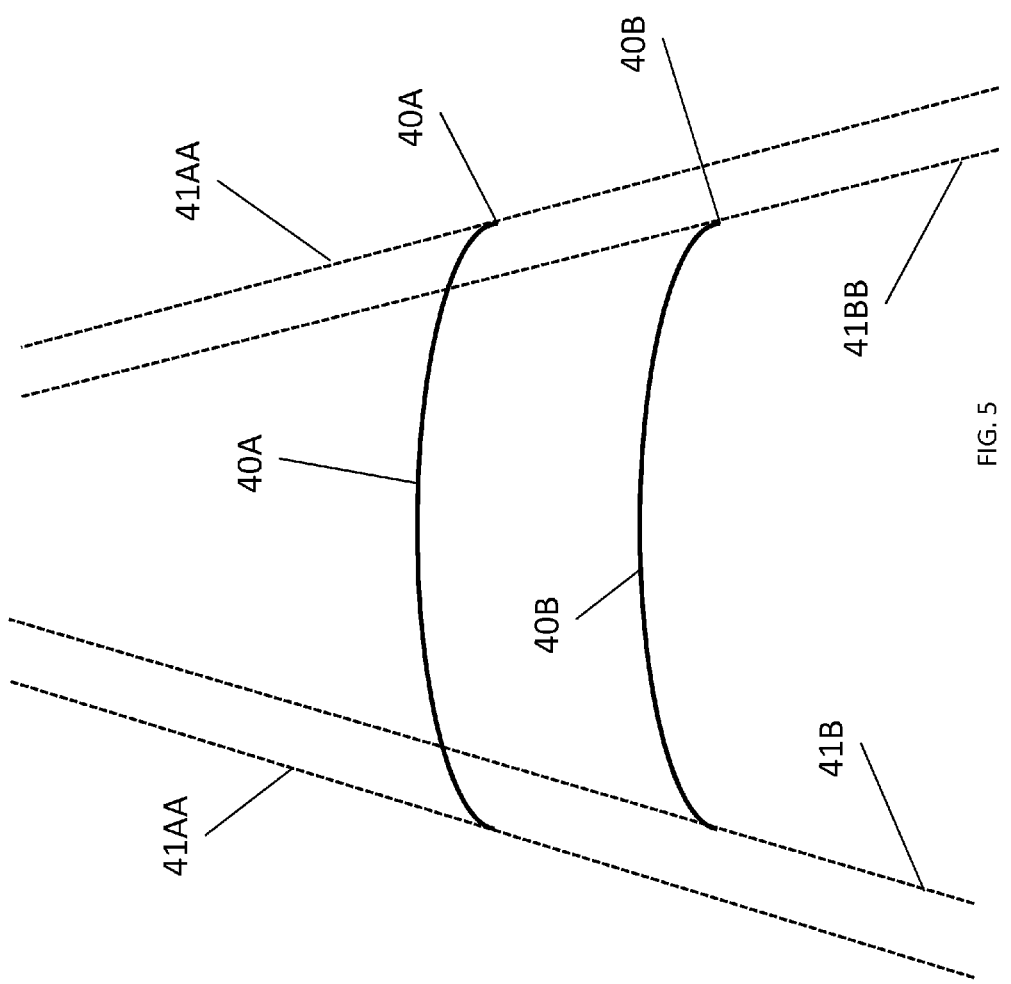
FIG. 5 is a schematic showing exemplary laser lines against the reference plane for use in imaging and measuring the geometric shape of a rail.

FIG. 5 depicts a top view of a rail from the point of view of the camera or measuring device and shows an exemplary embodiment relating to the shape of the measurement plane, as it would be measured during locomotion by the measurement camera (not shown). Again, the measurement plane is pictured to describe the manner in which the rail would be "viewed" from the perspective of the measurement camera and not an actual structure. FIG. 5 thus depicts a hypothetical view of a passing rail as would be viewed by the measurement camera. Exemplary laser lines 40A, 40B are shown across the rail. The first laser line 40A is shown intersecting a deflected rail, as defined by the dashed lines at 41A and 41AA. An un-deflected line 40B is also shown on the hypothetical un-deflected rail defined by the dashed lines 41B and 41BB. For reference, and by way of further example, the dashed lines represent the perspective difference in the rail when deflected 41A, 41AA and un-deflected 41B, 41BB. In this exemplary embodiment, therefore, the deflected rail would cause the laser line to move up 40A, relatively, as would be viewed from the perspective of the measurement camera. The measurement camera can thus estimate the magnitude of the rail deflection as it traverses the tracks by locating the line laser in its field of view. This can be done in real time and from a moving rail car using methods similar to those described in U.S. Pat. Nos. 7,920,984, 7,403,296, 7,755,774, 7,942,058, and 7,937,246, and U.S. Published Applications 2009/0056454, 2011/0098942, 2012/0132005, 2009/0070064, 2011/0166827, and 2012/0300060, all of which are hereby incorporated herein by reference in their entireties.

With the knowledge of the location of the rail at the measurement plane, several rail parameters can be derived. For example, this truck structure ensures that the wheel/rail contact points are fixed relative to the measurement system. The knowledge of the two wheel/rail contact points and the rail location at the measurement point can result in the estimation of various cords and rail quality parameters as described in the above-referenced patents, publications, and papers.

Also, in certain embodiments, other measurements can be made with additional sensors to render further information about the shape of the rail as the rail car passes over it. By way of example, a measurement can be made 3 feet away from the wheel/rail contact point and a second measurement can be made 5 feet away, etc. As a second example, measurements can be made from both sides of the sideframe by mounting a second sensor head on the opposite side of the sideframe.

Figure 6:
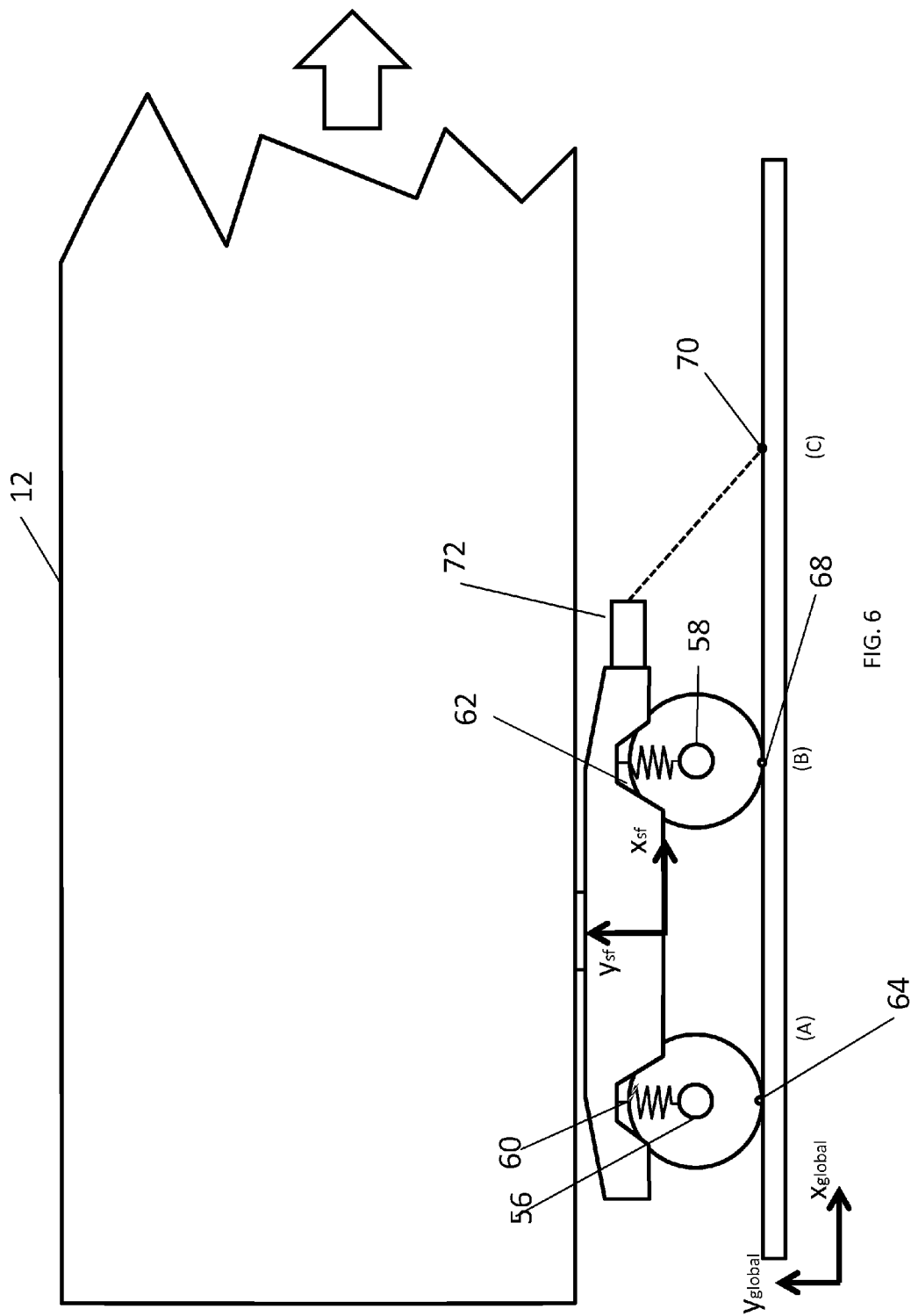
FIG. 6 is a schematic drawing showing an exemplary embodiment of the vision system on a railcar showing the sideframe.

A second exemplary embodiment is shown in FIG. 6. In this and similar embodiments, the measurement system vertical would be incorporated into a railcar 50 having an alternate truck structure. Here, the truck structure features a suspension system or device 52—such as springs and/or dampers—between the sideframe 54 and wheel axles 56, 58. In FIGS. 6-12, this is shown schematically as springs 60, 62, although other configurations are possible. It is possible in certain embodiments that the location of the wheel/rail contact points A (labeled in FIG. 6 with reference number 64) and B (labeled in FIG. 6 with reference number 68) are not generally known relative to the sideframe 54 because of the unknown deflection of the sideframe.

By way of example, three points are shown in FIG. 6. The first two points define the wheel/rail contact points A (64) and B (68). More specifically, a first wheel (on axle 56) contacts the rail at contact point A (64), while a second wheel (on axle 58) contacts the rail at contact point B (68). A third point is the measurement point C (70) that can be measured with a sensor system 72. Additional points can be included either from additional wheel/rail contact points (similar to A (64) and B (68) if the railcar has more axles), or more points measured along the rail (similar to C (70), extended either proximally or distally). The measurement system 72 presented in this example measures the relative location between such points, which in this exemplary embodiment are points A (64), B (68), and C (70). In the present example, it is expressed in a common reference frame 74 attached to the sideframe 54, labeled in FIG. 6 with the unit vectors Xsf and Ysf. In certain exemplary embodiments, a non-Newtonian reference frame is utilized, as compared to a global reference frame such as the one defined by Xglobal and Yglobal, which is also depicted in FIG. 6. Any of the points mentioned may be used to define the reference frame, given that certain distances are known and others are unknown, and the calculations can be run from each reference point regardless of the particular embodiment selected.

Figure 7:
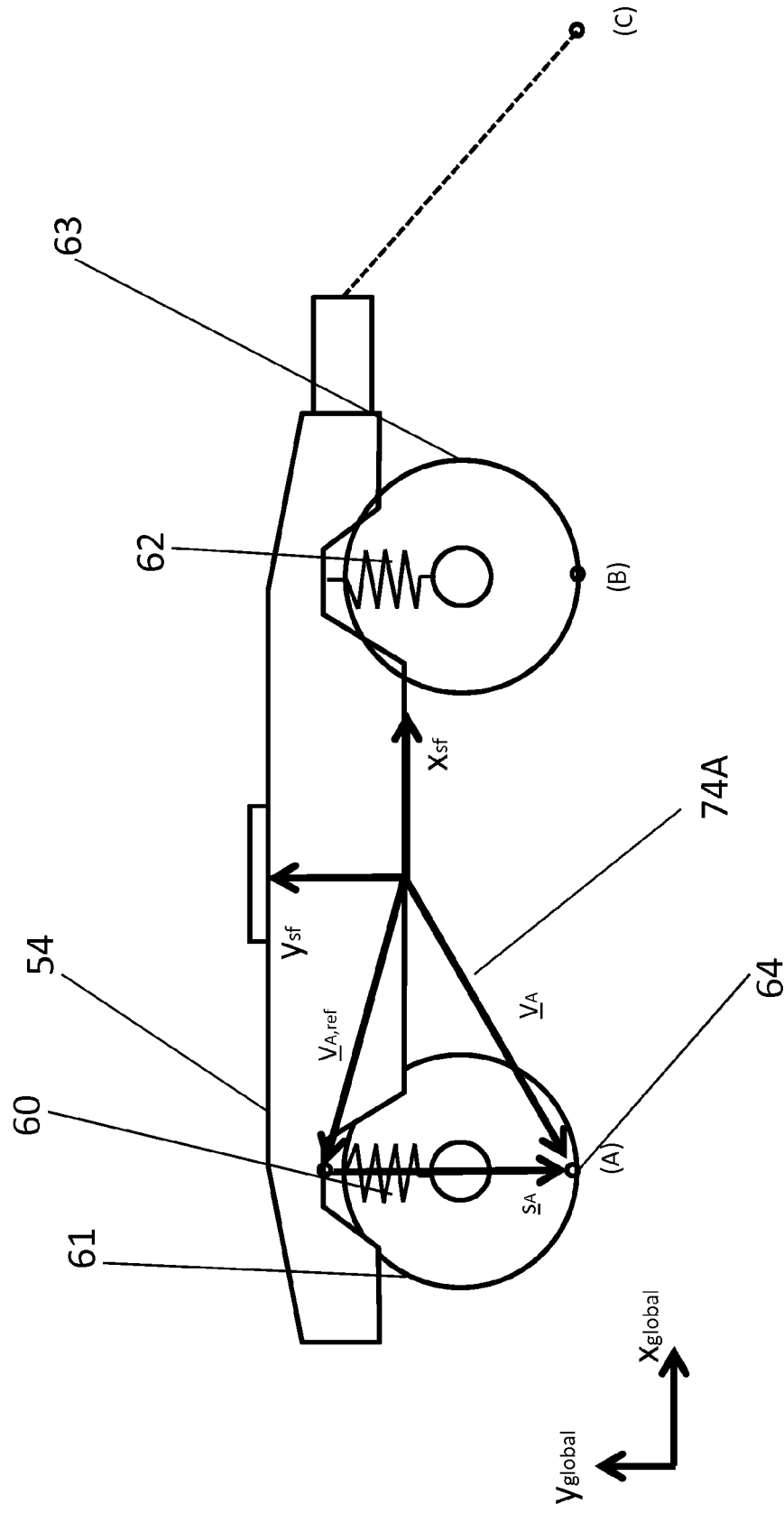
FIG. 7 is a schematic drawing showing an exemplary embodiment of the vision system on a railcar showing the sideframe reference frame.

FIG. 7 depicts an exemplary embodiment in which contact point A (64) is located in the sideframe reference frame 74A given by the vector $\underline{V}_A$ (shown here by reference arrow D). Generally, it may be difficult to know the location of A (64) relative to the sideframe reference frame since the wheel 61 moves relative to the sideframe 54 because of the suspension 60, 62. As would be apparent to one of skill in the art, various sensors could be implemented to make these measurements. In certain embodiments, the suspension restricts wheel vertical movement relative to the sideframe 54. In such embodiments, a sensor can be employed to measure the vertical displacement of the spring 60 compared to the known displacement of the spring 60, thereby allowing the estimation of the wheel location and the wheel/rail contact point A (64) relative to the sideframe reference frame 74A. As depicted in FIG. 7, the location $\underline{V}_A$ is the sum of the fixed unchanging vector $\underline{V}_{A,ref}$ (shown here by reference arrow E) and the measured spring displacement $\underline{S}_A$ (shown here by reference arrow F). Measurement of spring displacement, $\underline{S}_A$, can be made with numerous sensors such as LVDTs, ultrasonic, laser based, string potentiometers, and numerous other sensors, as would be known to one of skill in the art.

Figure 8:
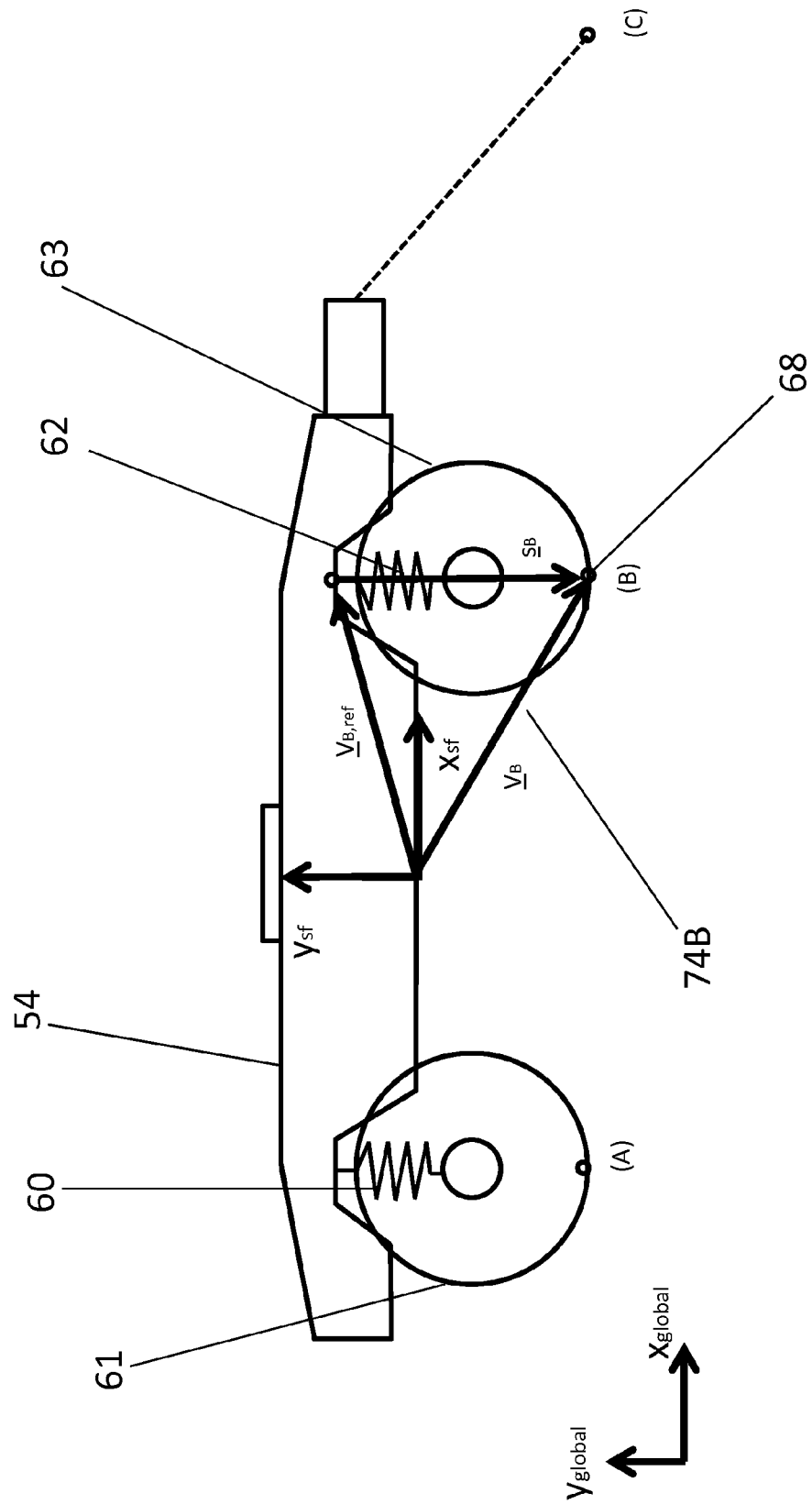
FIG. 8 is a schematic drawing showing a further illustrative example of the sideframe reference frame.

FIG. 8 depicts an exemplary embodiment in which contact point B (68), is located in the sideframe reference frame 74B given by the vector $\underline{V}_B$ (shown here by reference arrow H). Generally, it may be difficult to know the location of B (68) relative to the sideframe reference frame 74B since the wheel 63 moves relative to the sideframe 54 because of the suspension 60, 62. As discussed in relation to FIG. 7, various sensors could be implemented to make these measurements. In the embodiment depicted in FIG. 8, the location $\underline{V}_B$ is the sum of the fixed unchanging vector $\underline{V}_{B,ref}$ (shown here by reference arrow G) and the measured spring displacement $\underline{S}_B$ (shown here by reference arrow I). Again, the measurement of spring displacement, $\underline{S}_A$, can be made with numerous sensors such as LVDTs, ultrasonic, laser based, string potentiometers, and numerous other sensors.

Figure 9:
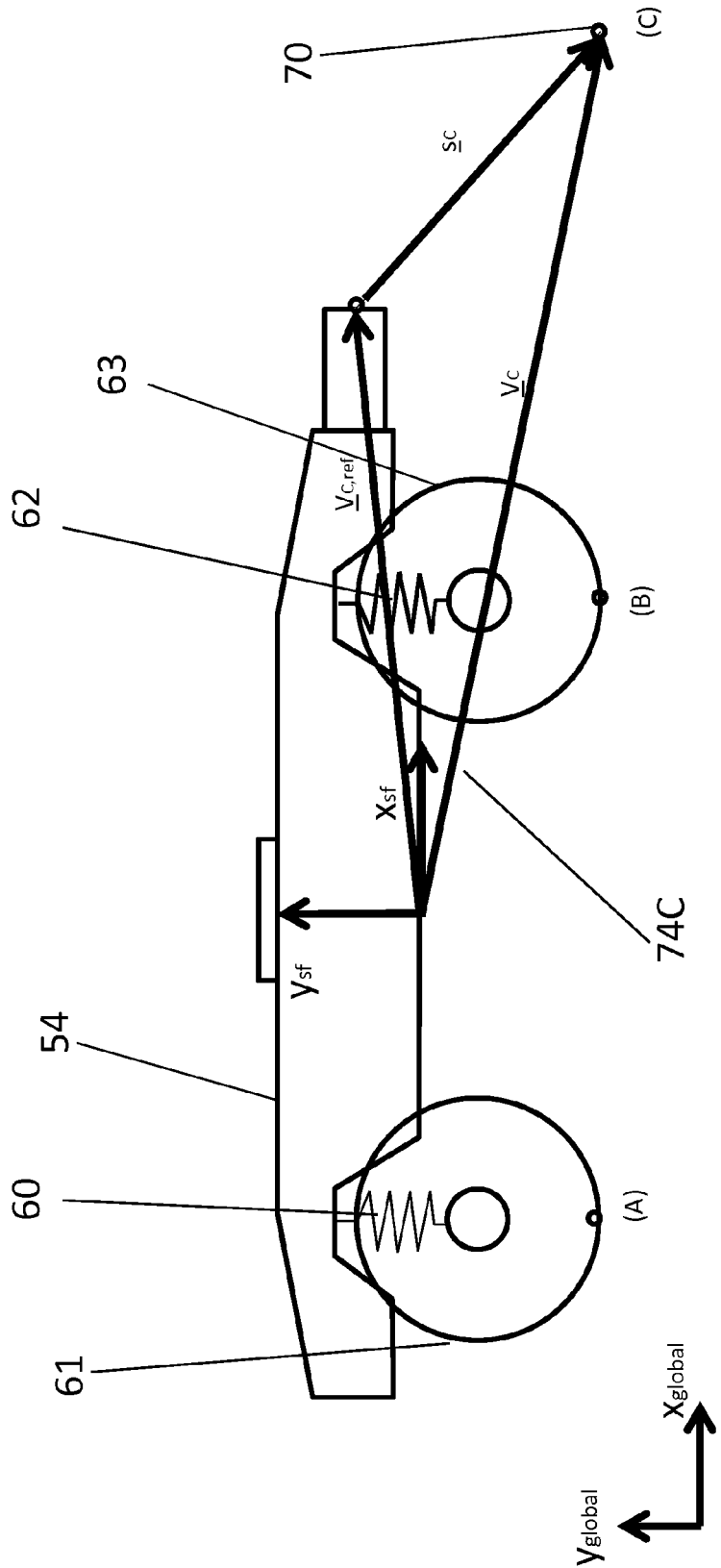
FIG. 9 is a schematic drawing showing yet another illustrative example of the sideframe reference frame according to one embodiment.

FIG. 9 depicts an exemplary embodiment in which measurement point C (70), is located in the sideframe reference frame 74C given by the vector $\underline{V}_C$. (shown here by reference arrow J). Again, as discussed above, it may be difficult to know the location of measurement point C (70) relative to the sideframe reference frame 74C because C (70) moves relative to the sideframe because of the suspension and rail movement. Various sensors could be implemented to make this measurement such as the sensors described above, or systems used in previous applications referenced herein, or other sensors to measure $\underline{S}_C$ (shown here by reference arrow K). As shown here, the location $\underline{V}_C$ is the sum of the fixed unchanging vector $\underline{V}_{C,\,ref}$ (shown here by reference arrow L) and the measured spring displacement $\underline{S}_C$.

Figure 10:
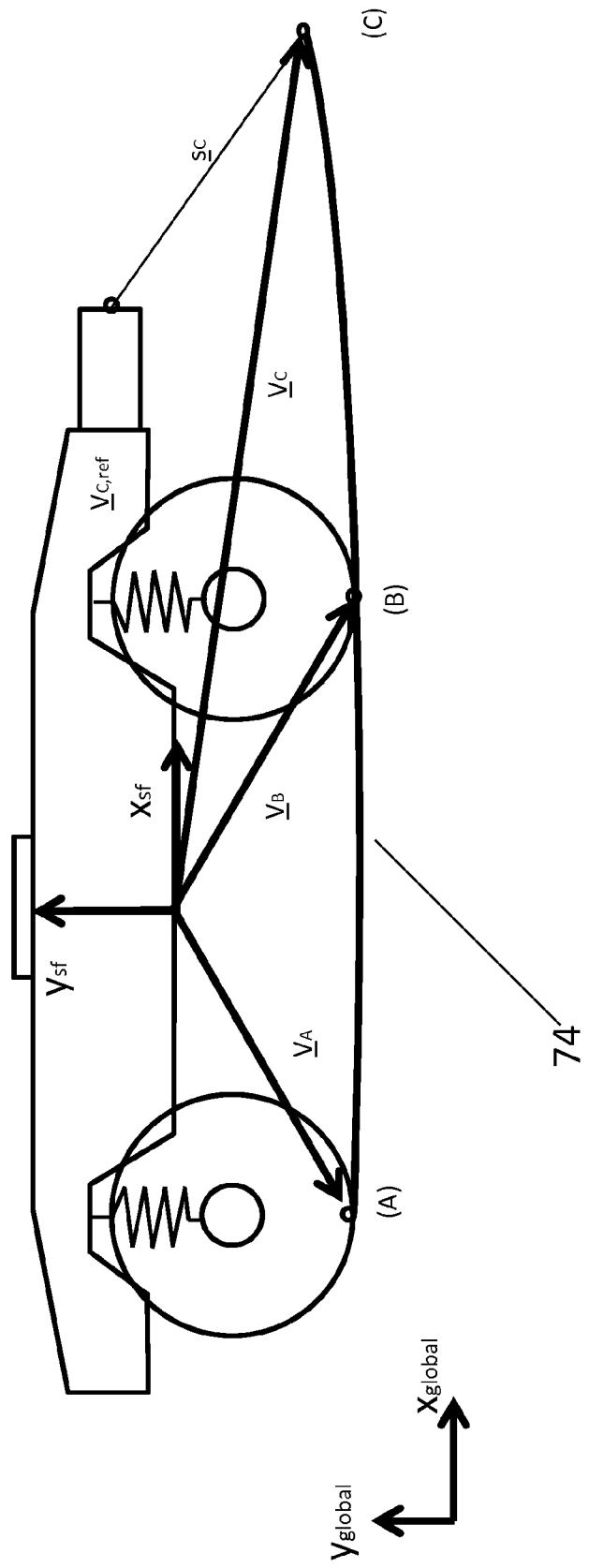
FIG. 10 is a schematic drawing showing yet another illustrative example of an the sideframe reference frame alternate according to one embodiment.
Figure 11:
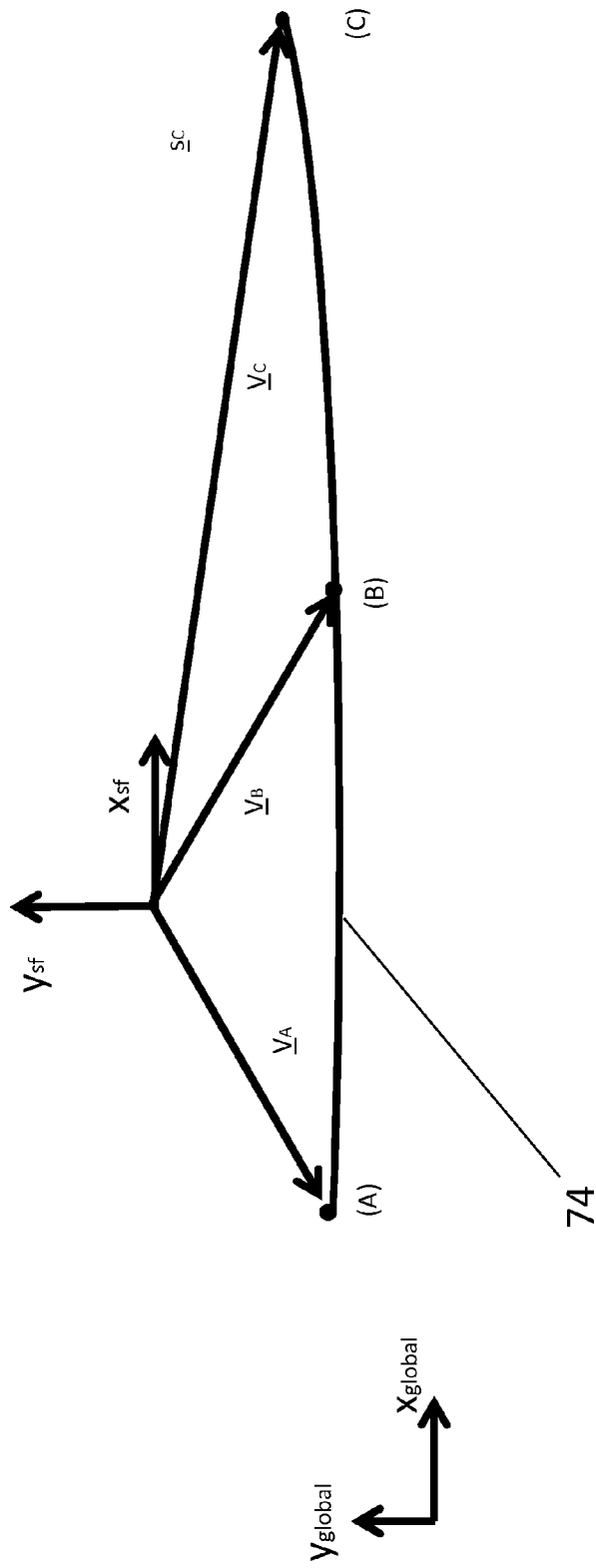
FIG. 11 is a schematic drawing showing an exemplary embodiment of the sideframe reference frame in space, without a rail car.
Figure 12:
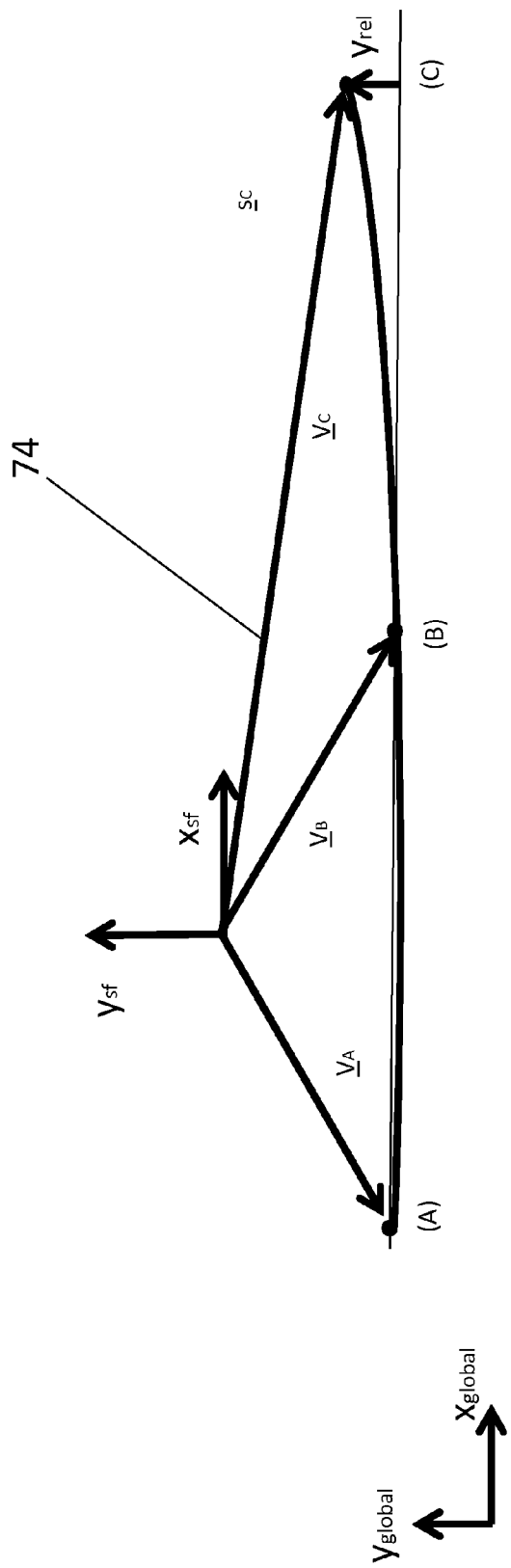
FIG. 12 is a schematic drawing showing an exemplary embodiment of the sideframe reference frame in space, without a rail car.

FIGS. 10-12 depict the location of all three measurements discussed in FIGS. 7-9—$\underline{V}_A$, $\underline{V}_B$, $\underline{V}_C$—given in this exemplary sideframe reference frame 74. As would be clear to one of skill in the art, myriad other points and other reference frames are possible. By way of example, in certain embodiments the origin of the reference frame that is used originates at either contact point A (64) or contact point B (68). While in these embodiments this would result in a different combination of the already identified vectors, it would not depart from the spirit and teachings of the present disclosure.

Given the knowledge of the location of these points—A (64), B (68), and C (70)—various estimates of rail quality can be made. By way of example, the curvature of the rail under the weight of the railcar could be estimated and could be correlated to railstress. Other indicators of quality can also be estimated with these measurements, as has been disclosed in the incorporated references. Also, more points can be included such as additional wheel/rail contact points and/or other measurement points, as is apparent in FIGS. 10-12.

An exemplary embodiment is depicted in FIG. 12. In this embodiment, one track parameter that can be calculated is the relative displacement given by the parameter of rail quality called "Yrel" and defined in currently pending U.S. application Ser. No. 13/046,064, entitled "Vertical Track Modulus Trending," which is hereby incorporated herein by reference in its entirety.

As would be clear to one of skill in the art, additional techniques can be used to calibrate the camera images and measurements relative to true measurements in the real world. By way of example, known objects can be placed in view along the deflected rail and the shape of the rail can be measured with other techniques such as GPS or a surveyor's system or rulers. In addition, the railcar could be moved onto a very stiff section of track, such as a slab track or track over concrete in a car shop, and the shape of the relatively straight rail could be used to establish the calibration.

Certain embodiments can further include determining a vertical track deflection at each location along the rail using the measurements obtained with the imaging system. According to one implementation, the measured vertical track deflection measurements can be used to further determine a track modulus associated with each measurement point along the track, which can be used to determine whether portions of the track may require maintenance. In certain embodiments, these measurements can also be used to determine whether there may have been any tampering with the rail that may require immediate servicing. The imaging system can also be used to measure the quality of the track structure, and could be used to identify other problems such as broken ties or missing bolts in the joints, or to detect the presence of foreign material on the track such as natural debris or implements left to damage the track.

In certain embodiments, the measurement of vertical track deflection can also be combined with other measurements of track geometry and/or track quality to produce new metrics of track quality. Other measurements that can be made include gage, cant, mid-cord offsets, end-cord offsets, measurements of longitudinal rail stress, measurements of gage restraint, measurements of vehicle track interaction or other acceleration-based measurements.

Various modifications and additions can be made to the exemplary embodiments discussed without departing from the scope of the present disclosure. For example, while the embodiments described above refer to particular features, the scope of this invention also includes embodiments having different combinations of features and embodiments that do not include all of the described features. Accordingly, the scope of the various embodiments is intended to embrace all such alternatives, modifications, and variations as fall within the scope of the claims, together with all equivalents thereof.

What is claimed is:

1. A system for imaging the geometric shape of a railroad track rail, the system comprising:
 a. a railcar atop a rail, the railcar further comprising:
  i. a suspension system;
  ii. a first wheel and a second wheel; and
  iii. a sideframe,
   wherein the first wheel is in contact with the rail at a first contact point and the second wheel is in contact with the rail at a second contact point;
 b. at least one imaging camera coupled to the sideframe of the railcar, wherein the imaging camera has a detection area along a line of sight along a longitudinal axis of a rail configured for generating vertical track deflection data during railcar movement along the rail and further configured to take measurements from at least one measurement point along the line of sight; and
 c. an evaluation unit including a processor configured to establish at least one reference frame for analyzing the measurements from the imaging camera and detecting one or more geometric variations of the rail along the rail,
  wherein the evaluation unit is further configured to account for differences in height introduced by the suspension system between the first contact point, the second contact point, and the at least one measurement point relative to the at least one reference frame.

2. The system of claim 1, wherein the at least one imaging camera further comprises a structured light emitter.

3. The system of claim 2, wherein the evaluation unit is adapted to analyze readings relating to deflection, modulus, rail curvature, and stiffness.

4. The system of claim 1, further comprising:
 a. a location identifier configured for acquiring global location data corresponding to a global location of the railcar; and
 b. a recording unit configured for storing data from the evaluation unit and the location identifier.

5. The system of claim 1, further comprising a transceiver.

6. The system of claim 1, wherein the evaluation unit is configured to measure the geometric shape of the rail at a plurality of points to assess potential failures.

7. The system of claim 6, wherein the potential failures consist of failures selected from the group consisting of rail joint failures, rail tie failures, and rail failures.

8. The system of claim 2, wherein the evaluation unit is further configured to measure changes in the geometric shape of the rail away from an expected position.

9. The system of claim 8, wherein the evaluation unit is further configured to measure changes in the geometric shape of the rail within a plurality of images.

10. The system of claim 9, wherein the at least one imaging camera is configured to stereoscopically image the rail.

11. A vision system for imaging the geometric shape of a structure subjected to loading with a railcar comprising:
   a. a railcar further comprising a sideframe, a suspension system, a first wheel and a second wheel in contact with the structure, wherein the first wheel is in contact with the structure at a first contact point and the second wheel is in contact with the structure at a second contact point;
   b. at least one structured light emitter;
   c. at least one imaging camera coupled to the sideframe of the railcar in a fixed position and configured to establish at least one reference frame and generate readings from:
      a. i. at least one point along the structure illuminated by the structured light emitter;
      b. ii. the first contact point; and
      c. iii. the second contact point; and
   d. an evaluation unit capable of determining distance between the imaging camera, the point where the first wheel contacts the structure and the point where the second wheel contacts the structure and evaluating the readings with a processor configured for analyzing the readings from the imaging camera by measuring geometric shape of the structure by comparing the readings to the distance between the first contact point or second contact point and the imaging camera, wherein the evaluation unit is further configured to account for differences in height introduced by the suspension system.

12. The system of claim 11, wherein the evaluation unit is configured to measure the geometric shape of the rail at a plurality of points along a rail to assess potential failures.

13. The system of claim 12, wherein the potential failures consist of failures selected from the group consisting of rail joint failures, rail tie failures, and rail failures.

14. The system of claim 11, further comprising:
   a. a location identifier configured for acquiring global location data corresponding to a global location of the railcar; and
   b. a recording unit configured for storing data from the evaluation unit and the location identifier.

15. The system of claim 11, further comprising a transceiver.

16. The system of claim 11, wherein the evaluation unit is configured to measure geometric shape of the rail at a plurality of points along a rail.

17. The system of claim 16, wherein the evaluation unit is further configured to measure spring displacement.

18. The system of claim 17, wherein the evaluation unit is further configured to measure changes in the geometric shape of the rail away from an expected position.

19. A method for analyzing the geometric shape of a railroad track rail, the method comprising:
   a. providing a railcar comprising a sideframe, a suspension system, a first wheel comprising a first contact point on the rail and a second wheel comprising a second contact point on the rail;
   b. providing at least one imaging camera coupled to the sideframe of a railcar, wherein the imaging camera has a detection area along a line of sight along a longitudinal axis of a rail and configured for generating readings of the geometric shape of the rail during railcar movement along the rail from a plurality of locations along the rail;
   c. providing an evaluation unit including a processor configured for analyzing the readings from the imaging camera and detecting one or more geometric variations of the rail along the length of the rail and further configured to establish a reference frame configured to evaluate the distance between the first contact point and rail car and the second contact point and the rail car;
   d. evaluating the geometric shape of the railroad track rail;
   e. accounting for variations introduced by the suspension system; and
   f. predicting a future performance of the rail based on the geometric variations.

20. The method of claim 19, wherein the at least one imaging camera further comprises a structured light emitter.

* * * * *